US010383083B2

(12) United States Patent
Liu et al.

(10) Patent No.: US 10,383,083 B2
(45) Date of Patent: Aug. 13, 2019

(54) WIRELESS LOCAL AREA NETWORK BASED POSITIONING METHOD AND DEVICE

(71) Applicant: Beijing Xiaomi Mobile Software Co., Ltd., Haidian District, Beijing (CN)

(72) Inventors: Jia Liu, Beijing (CN); Li Lin, Beijing (CN); Ziqiang Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/701,137

(22) Filed: Sep. 11, 2017

(65) Prior Publication Data

US 2018/0084521 A1 Mar. 22, 2018

(30) Foreign Application Priority Data

Sep. 18, 2016 (CN) .............................. 2016 1 0828809

(51) Int. Cl.
*G01S 5/02* (2010.01)
*H04W 64/00* (2009.01)
*G01S 11/06* (2006.01)

(52) U.S. Cl.
CPC ......... *H04W 64/003* (2013.01); *G01S 5/0252* (2013.01); *G01S 5/0284* (2013.01); *G01S 11/06* (2013.01); *H04W 64/00* (2013.01)

(58) Field of Classification Search
CPC .......................... H04W 64/003; G01S 5/0252
See application file for complete search history.

(56) References Cited

U.S. PATENT DOCUMENTS

| 7,554,932 | B1* | 6/2009 | Shurmantine | H04B 7/155 370/279 |
| 7,634,269 | B2* | 12/2009 | Gallagher | H04W 16/16 370/331 |
| 2003/0087631 | A1* | 5/2003 | Diachina | H04M 1/72572 455/414.1 |

(Continued)

FOREIGN PATENT DOCUMENTS

| CN | 1710857 A | 12/2005 |
| CN | 101771671 A | 7/2010 |

(Continued)

OTHER PUBLICATIONS

Chinese Office Action (including English translation) issued in corresponding CN Patent Application No. 201610604844.6, dated Dec. 27, 2018, 31 pages.

(Continued)

*Primary Examiner* — Asghar H Bilgrami
(74) *Attorney, Agent, or Firm* — Arch & Lake LLP

(57) ABSTRACT

The present disclosure provides a wireless local area network based positioning method and device. The method includes: acquiring first RSSI information and at least one second RSSI information; receiving at least one third RSSI information reported by a mobile terminal; receiving at least one fourth RSSI information reported by at least one intelligent device; determine positioning of the mobile terminal, a routing device, and the at least one intelligent device based on the first RSSI information, the at least one second RSSI information, the at least one third RSSI information, and the at least one fourth RSSI information.

9 Claims, 5 Drawing Sheets

(56) References Cited

U.S. PATENT DOCUMENTS

| | | | | |
|---|---|---|---|---|
| 2004/0213189 | A1* | 10/2004 | Alspaugh | H04L 12/5601 370/338 |
| 2005/0048993 | A1* | 3/2005 | Ammar | H04B 1/18 455/502 |
| 2012/0253847 | A1* | 10/2012 | Dell'Anno | A61B 5/0022 705/3 |
| 2013/0170374 | A1* | 7/2013 | Aljadeff | G01S 5/14 370/252 |
| 2013/0197955 | A1* | 8/2013 | Dillon | H04W 40/246 705/7.13 |
| 2016/0173227 | A1* | 6/2016 | Kikuma | H01Q 1/005 455/63.4 |
| 2016/0212691 | A1* | 7/2016 | Roeland | H04W 48/18 |
| 2017/0026794 | A1* | 1/2017 | Baker | H04W 4/023 |
| 2017/0371074 | A1* | 12/2017 | Elkabetz | G01S 13/95 |

FOREIGN PATENT DOCUMENTS

| | | |
|---|---|---|
| CN | 101867777 A | 10/2010 |
| CN | 101917569 A | 12/2010 |
| CN | 101103280 B | 4/2011 |
| CN | 102693388 A | 9/2012 |
| CN | 102739791 A | 10/2012 |
| CN | 103841170 A | 6/2014 |
| CN | 104270474 A | 1/2015 |
| CN | 104836862 A | 8/2015 |
| CN | 103217662 B | 10/2015 |
| CN | 105376277 A | 3/2016 |
| CN | 105577712 A | 5/2016 |
| WO | 2015143847 A1 | 10/2015 |

* cited by examiner

WIRELESS LOCAL AREA NETWORK BASED POSITIONING METHOD AND DEVICE

CROSS-REFERENCE TO RELATED APPLICATION

The present application is based upon and claims priority to the Chinese patent application No. 201610828809.2 filed on Sep. 18, 2016, the entire contents of which are incorporated herein by reference.

TECHNICAL FIELD

The present disclosure relates to the field of positioning technology, and more particularly, to a wireless local area network based positioning method and device.

BACKGROUND

With the development of computer and network communication technologies, intelligent devices such as wireless sockets, air purifiers, water purifiers and the like are gradually implemented and used. Often times, multiple intelligent devices are deployed in one room and, as such, there is a need for positioning these intelligent devices so as to perform separate control and management on them. The indoor positioning technology becomes a broad space for development. With extensive deployment and popularization of wireless local area network (WLAN), WLAN based indoor positioning technology has been a research hot spot in the field of indoor positioning technology in recent years.

SUMMARY

The present disclosure provides system and methods that include a wireless local area network based positioning method, a wireless local area network based positioning device, and a non-transitory computer readable storage medium for positioning.

According to a first aspect of the present disclosure, a wireless local area network based positioning method is provided. The method may include: acquiring first Received Signal Strength Indicator (RSSI) information and at least one second RSSI information, where the first RSSI information is measured based on a first point-to-point message sent by a mobile terminal, and the at least one second RSSI information is measured based on a second point-to-point message sent by at least one intelligent device; receiving at least one third RSSI information reported by the mobile terminal, where the at least one third RSSI information is measured based on a third point-to-point message sent by the at least one intelligent device to the mobile terminal.

The method may also include receiving at least one fourth RSSI information reported by the at least one intelligent device, where the at least one fourth RSSI information is measured based on a fourth point-to-point message sent by any one of the at least one intelligent device to other intelligent devices; and reporting positioning of the mobile terminal, the routing device, and the at least one intelligent device based on the first RSSI information, the at least one second RSSI information, the at least one third RSSI information, and the at least one fourth RSSI information.

According to a second aspect of present disclosure, a wireless local area network based positioning device is provided. The device may include a processor, and a memory for storing instructions executable by the processor. The processor may be configured to: acquire first Received Signal Strength Indicator (RSSI) information and at least one second RSSI information, where the first RSSI information is measured based on a first point-to-point message sent by a mobile terminal, and the at least one second RSSI information is measured based on a second point-to-point message sent by at least one intelligent device; receive at least one third RSSI information reported by the mobile terminal, wherein the at least one third RSSI information is measured based on a third point-to-point message sent by the at least one intelligent device to the mobile terminal; and receive at least one fourth RSSI information reported by the at least one intelligent device, wherein the at least one fourth RSSI information is measured based on a fourth point-to-point message sent by any one of the at least one intelligent device to other intelligent devices.

The processor may also be configured to generate a report of positioning of the mobile terminal, the routing device, and the at least one intelligent device based on the first RSSI information, the at least one second RSSI information, the at least one third RSSI information, and the at least one fourth RSSI information.

According to a third aspect of the present disclosure. A non-transitory computer readable storage medium is provided. The non-transitory computer readable storage medium includes instructions and when the instructions are executed, may cause the mobile terminal to acquire first Received Signal Strength Indicator (RSSI) information and at least one second RSSI information, where the first RSSI information is measured based on a first point-to-point message sent by a mobile terminal, and the at least one second RSSI information is measured based on a second point-to-point message sent by at least one intelligent device; receive at least one third RSSI information reported by the mobile terminal, wherein the at least one third RSSI information is measured based on a third point-to-point message sent by the at least one intelligent device to the mobile terminal; receive at least one fourth RSSI information reported by the at least one intelligent device, wherein the at least one fourth RSSI information is measured based on a fourth point-to-point message sent by any one of the at least one intelligent device to other intelligent devices; and report positioning of the mobile terminal, the routing device, and the at least one intelligent device based on the first RSSI information, the at least one second RSSI information, the at least one third RSSI information, and the at least one fourth RSSI information.

It is to be understood that both the foregoing general descriptions and the following detailed descriptions are exemplary and explanatory only and do not limit the scope of the disclosure.

BRIEF DESCRIPTION OF THE DRAWINGS

The drawings herein are incorporated in and constitute a part of this specification, showing examples consistent with the present disclosure, and together with the descriptions, serve to explain the principles of the present disclosure.

Figure 1:
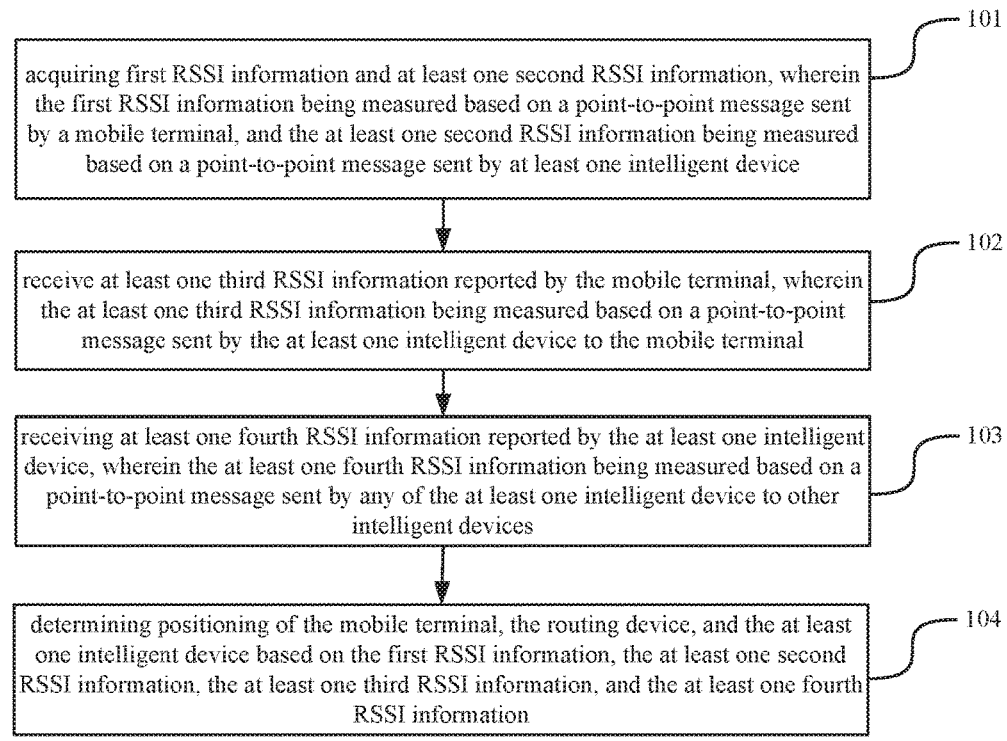
FIG. 1 shows a flow chart of a WLAN based positioning method in accordance with an aspect of the present disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

Hereinafter, exemplary examples will be described in detail, those examples may be shown in the drawings. In the following descriptions when referring to the drawings, the same numerals in the different drawings denote the same or similar elements unless otherwise indicated. The examples described in the following are not representative of all examples consistent with the present disclosure. Rather, they are merely examples of apparatuses and methods consistent with some aspects of the present disclosure as detailed in the appended claims.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment," "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

The use of intelligent devices inside a house becomes popular. The indoor intelligent devices may include wireless sockets, air purifiers, water purifiers and the like. Positioning of an indoor intelligent device may be implemented by measuring strength of wireless signals received by an intelligent device. For example, by utilizing Received Signal Strength Indicator (RSSI) information, the distance between an access point (AP) at wireless signal transmitter side and the intelligent device can be estimated by using an empirical formula between signal strength and distance, and the location of the intelligent device can be determined according to the estimated distance.

FIG. 1 shows a flow chart of a wireless local area network (WLAN) based positioning method in accordance with an aspect of the present disclosure. As shown in FIG. 1, the WLAN based positioning method is used in a routing device. The method may include the following steps.

At step 101, the first Received Signal Strength Indicator (RSSI) information and at least one second RSSI information are acquired. The first RSSI information may be measured based on a point-to-point message sent by a mobile terminal, and the at least one second RSSI information is measured based on a point-to-point message sent by at least one intelligent device.

At step 102, at least one third RSSI information reported by the mobile terminal is received. The at least one third RSSI information is measured, such as based on a point-to-point message sent by the at least one intelligent device to the mobile terminal.

At step 103, at least one fourth RSSI information reported by the at least one intelligent device is received. The at least one fourth RSSI information may be measured based on a point-to-point message sent by any of the at least one intelligent device to other intelligent devices.

At step 104, determine a positioning of the mobile terminal, the routing device, and the at least one intelligent device is performed based on the first RSSI information, at least one second RSSI information, at least one third RSSI information, and at least one fourth RSSI information.

With the method provided by the present aspect, positioning is implemented based on a distance between two devices with high accuracy by collecting RSSI information of point-to-point messages between every two devices to be positioned. The RSSI information may represent distances between the devices to be positioned.

In a possible implementation, the step of determining the positioning of the mobile terminal, the routing device, and the at least one intelligent device based on the first RSSI information, the at least one second RSSI information, the at least one third RSSI information, and the at least one fourth RSSI information may include: deriving a relative location map based on the first RSSI information, the at least one second RSSI information, the at least one third RSSI information, and the at least one fourth RSSI information, and transmitting the relative location map to the mobile terminal, where the relative location map may indicate relative position between the mobile terminal, the routing device, and the at least one intelligent device. Alternatively, the first RSSI information, the at least one second RSSI information, the at least one third RSSI information, and the at least one fourth RSSI information may be transmitted to a designated server such that the designated server may plot the relative location map and then transmit the relative location map to the mobile terminal.

With the method provided by the present aspect, relative location between the devices to be positioned may be determined by deriving a relative location map. The relative location map can be plotted by the routing device or by a designated server.

In a possible implementation, the step of deriving a relative location map based on the first RSSI information, the at least one second RSSI information, the at least one third RSSI information, and the at least one fourth RSSI information may include: determining a first distance between the routing device and the mobile terminal based on the first RSSI information, where any point on a first circle is the location of the mobile terminal, the center of first circle is the location of the routing device and the radius of the first circle is the first distance.

The step of deriving the relative location map may also include determining at least one second distance between the routing device and the at least one intelligent device based on the at least one second RSSI information and determining at least one third distance between the mobile terminal and the at least one intelligent device based on the at least one third RSSI information, where at least two intersections of at least one second circle and at least one third circle are possible locations of the at least one intelligent device, the center of each second circle is the location of the routing device, the radius of each second circle is the second distance, the center of each third circle is the location of the mobile terminal and radius of the third circle is the third distance.

With the method provided by the present aspect, it is able to implement positioning accurately by determining distance between every two devices to be positioned using a plurality of RSSI information, deriving a plurality of circles according to the distances, and determining relative location among the devices based on intersections between the circles to obtain a relative location map.

In a possible implementation, the method may further include: acquiring fifth RSSI information when a new intelligent device appears, where the fifth RSSI information may be measured based on a point-to-point message sent by the new intelligent device. The method may include receiving sixth RSSI information reported by the mobile terminal, where the sixth RSSI information may be measured based on a point-to-point message sent by the new intelligent device to the mobile terminal. The method may include receiving at least one seventh RSSI information reported by the new intelligent device, where the at least one seventh RSSI information may be measured based a point-to-point message sent by any one of the at least one intelligent device to the new intelligent device. The method may include determining positioning based on the fifth RSSI information, the sixth RSSI information, the at least one seventh RSSI information, and a last positioning process.

With the method provided by the present aspect, collected RSSI information of a point-to-point message from a new intelligent device can be used to help position a device. The point-to-point message may represent the distance between the new intelligent device and the positioned device, such that positioning of the new intelligent device based on the distance between the intelligent device and the positioned device is possible.

In a possible implementation, the step of determining or reporting positioning based on the fifth RSSI information, the sixth RSSI information, the at least one seventh RSSI information, and a last positioning process may include: determining positioning of the new intelligent device based on the fifth RSSI information, the sixth RSSI information, the at least one seventh RSSI information, and positioning the result of the last positioning process. Alternatively, the step may include determining positioning of the mobile terminal, the routing device, the at least one intelligent device and the new intelligent device based on the fifth RSSI information, the sixth RSSI information, the at least one seventh RSSI information, and positioning data acquired in the last positioning process.

With the method provided in the present aspect, it is able to implement determining of positioning by any of two ways when a new intelligent device appears, which brings high flexibility.

All of the alternative solutions described above may be combined in any way to form alternative aspects of the present disclosure.

Figure 2:
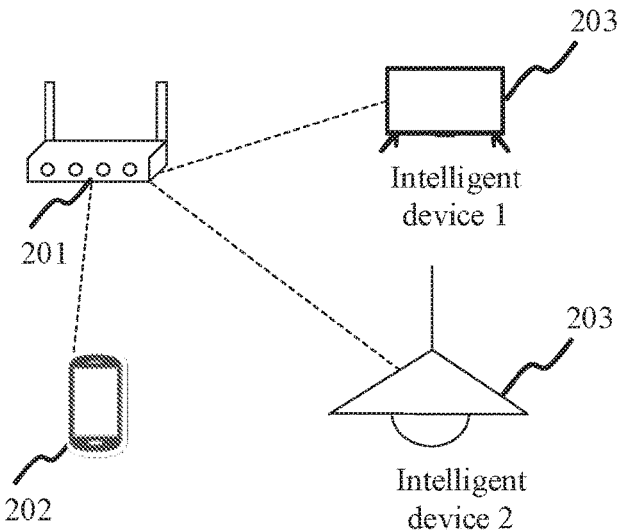
FIG. 2 is schematic diagram illustrating an environment in which a WLAN based positioning method in accordance with the present disclosure can be implemented.

FIG. 2 is schematic diagram illustrating an environment in which a WLAN based positioning method in accordance with the present disclosure can be implemented. As shown in FIG. 2, the implementation environment includes: a routing device 201, a mobile terminal 202, and at least one intelligent device 203 (only two intelligent devices, that is, intelligent device 1 and intelligent device 2, are illustrated as an example).

The routing device 201 may be a wireless router set in a local area network or any other intermediate device for network access.

The mobile terminal 202 may be a mobile terminal such as a smart phone, a smart hand ring, a tablet computer, a remote controller, or the like. The mobile terminal 202 may have a routing device management application (APP) installed for triggering and monitoring drawing of a relative location map by the routing device and for presenting the relative location map. The mobile terminal may access the routing device to connect to a network and transmit data to the routing device.

The intelligent device 203 may be a smart home device such as a wireless socket, an air purifier, a smart TV, an intelligent light, and the like. The intelligent device 203 may access the routing device to connect to the network and transmit data to the routing device.

In examples of the present disclosure, if the mobile terminal 202 and the intelligent device 203 are connected to the same routing device, the mobile terminal 202 and the intelligent device 203 belong to the same Basic Service Set (BSS). Tunneled Direct Link Setup (TDLS) can be established between intelligent devices such as between intelligent device 1 and intelligent device 2. The TDLS can also be established between an intelligent device and the mobile terminals in the same BSS. For example, TDLS can be established between intelligent device 1 or intelligent device 2 and the mobile terminal 202. By doing so, the mobile terminal is able to issue a control command to the intelligent device through the tunnel, and the tunnel communicates data between the intelligent devices and between the intelligent device and the mobile terminal. The data can thus be transmitted over a point-to-point message.

Figure 3:
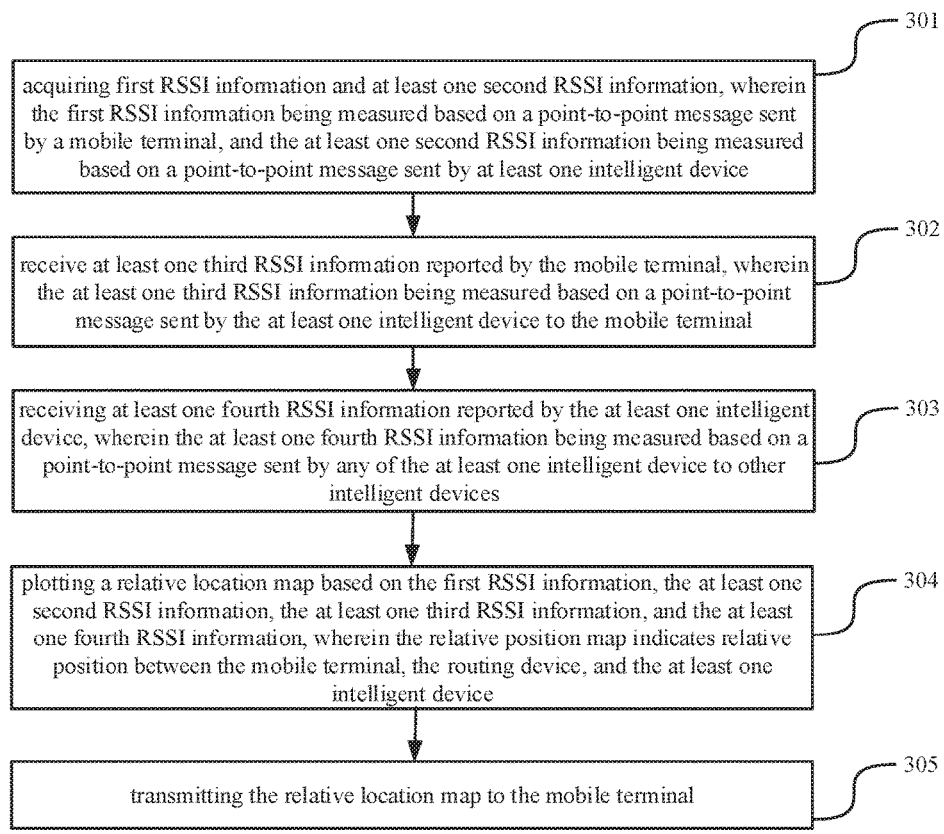
FIG. 3 shows a flow chart of a WLAN based positioning method in accordance with an aspect of the present disclosure.

FIG. 3 shows a flow chart of a WLAN based positioning method according to an aspect of the present disclosure. As shown in FIG. 3, the WLAN based positioning method can be used in a routing device. The method may include the following steps.

At step 301, the first RSSI information and at least one second RSSI information are acquired. The first RSSI information is measured based on a point-to-point message sent by a mobile terminal, and the at least one second RSSI information is measured based on a point-to-point message sent by at least one intelligent device.

Because a message may be attenuated during propagation from a sender to a receiver, a distance between the sender and the receiver can be obtained by measuring RSSI information contained in the message received at the receiver. In the present aspect, in order to determine distance between every two devices to be positioned, it is possible to obtain RSSI information of a point-to-point message between every two devices to be positioned.

In the step 301, the routing device may receive a point-to-point message sent by a mobile terminal to the routing device, and may measure RSSI information of the message to obtain first RSSI information. In a similar way, the routing device may receive a point-to-point message sent by at least one intelligent device to the routing device, and may measure RSSI information of the message to obtain at least one second RRSI information.

In the present aspect, the positioning process may be triggered by a user on the mobile terminal such that the mobile terminal sends a positioning request to the routing device. Upon reception of the positioning request, the routing device starts to execute the steps 301 to 305.

At step 302, at least one third RSSI information reported by the mobile terminal is received. The at least one third RSSI information is measured based on a point-to-point message sent by the at least one intelligent device to the mobile terminal.

In a similar way as in the step 301, the mobile terminal may receive a point-to-point message sent by at least one intelligent device to the mobile terminal, and may obtain at least one third RSSI information by measuring RSSI information contained in the messages, and may report the at least one third RSSI information to the routing device, so that the routing device can receive the at least one third RSSI message.

At step 303, at least one fourth RSSI information reported by the at least one intelligent device is received. The at least one fourth RSSI information is measured based on a point-to-point message sent by any one of the at least one intelligent device to other intelligent devices.

A point-to-point message may be transmitted between intelligent devices. For example, any one of the at least one intelligent device may send point-to-point messages to other intelligent devices so as to obtain at least one fourth RSSI information by measurement. For example, the intelligent device 1 can receive a point-to-point message sent by the intelligent device 2, obtain RSSI information according to the message, and report the RSSI information to the routing device. Similarly, the intelligent device 2 can also report RSSI information of a point-to-point message sent by the intelligent device 1 to the routing device. Then, the routing device can receive two RSSI information reported by the two intelligent devices.

At step 304, a relative positioning map is plotted based on the first RSSI information, at least one second RSSI information, at least one third RSSI information, and at least one fourth RSSI information. The relative positioning map is used for indicating relative position between the mobile terminal, the routing device, and at least one intelligent device.

Based on the RSSI information received at the step 301 to step 303, a report, such as relative location map, can be plotted among the mobile terminal, the routing device, and at least one intelligent device. The process of plotting the relative location map may include the following two steps including steps A and B.

In step A, a first distance between the routing device and the mobile terminal is determined based on the first RSSI information In this process, any point on a first circle reflects the location of the mobile terminal, the center of first circle is the location of the routing device, and the radius of the first circle is the first distance.

The first distance determined in step A does not actually contain the indication of any direction, and the mobile terminal may be located in any direction away from the routing device. Thus, it is possible to determine a first circle, any point on the first circle is a possible location of the mobile terminal.

The first circle can be displayed in the relative location map.

In step B, at least one second distance between the routing device and the at least one intelligent device is determined based on at least one second RSSI information and at least one third distance that is between the mobile terminal and at least one intelligent device based on the at least one third RSSI information. The at least two intersections of at least one second circle and at least one third circle are possible locations of the at least one intelligent device, where the center of each second circle is the location of the routing device, the radius of each second circle is the second distance, the center of each third circle is the location of the mobile terminal and the radius of the third circle is the third distance.

Based on the distance between the routing device and the intelligent device, the location of the intelligent device can be determined on a circle with the routing device being its center. Based on the distance between the mobile terminal and the intelligent device, the location of the intelligent device can be determined on a circle with the mobile device being its center. Thus, an intersection of these two circles can be obtained as a possible location of the intelligent device.

According to steps A and B, a relative location map among the devices to be positioned can be obtained based on the first circle, at least one second circle, at least one third circle and locations of the routing device, the mobile terminal, and at least one intelligent device in these circles. The relative location map may show several points at where the devices to be positioned are located. Alternatively, the relative location map may show the circles and have several points marked on the circles to indicate positions of the devices to be positioned. Different devices on the relative location map can be expressed by points with different colors, and different circles may be expressed in different colors in order to be distinguished them from each other.

In the present aspect, it is possible to determine the distance between the devices to be positioned based on the RSSI information by the following:

$$20 lgd \text{ (km)} = |RSSI| - 7.44 - 20 lgf \text{ (MHz)}$$

where d is a communication distance, f is the operation frequency of an electromagnetic wave.

The proceeding may be derived as follows.

In an ideal condition (i.e., propagation in a free space), the wireless communication distance can be obtained by the formula: ideal transmission loss (dB)=32.44+20lgd (km)+20lgf (MHz), where the ideal transmission loss=transmission power−reception sensitivity, where d is communication distance and f is operation frequency of an electromagnetic wave. Thus, in the ideal condition, the communication distance d is related with only the transmission power, the reception sensitivity and the operation frequency f.

In some applications, the wireless communication is affected by various external factors, such as atmosphere, obstructions and multipath and the like, which may cause losses. Assuming that an empirical value of the losses is 25 dB, the wireless communication distance thus is: the ideal transmission loss (dB)+25=32.44+20lgd (km)+20lgf (MHz).

In the present aspect, |RSSI| may be used as losses during signal transmission, so |RSSI|+25=32.44+20lgd (km)+20lgf (MHz). That is, 20lgd (km)=|RSSI|−7.44−20lgf (MHz).

In the steps 301 to 304, the distance between the respective devices is obtained based on the RSSI information received between the devices, and the relative location map among the devices is obtained according to the distances. For example, when having a routing device, a mobile terminal and two intelligent devices (intelligent device 1 and intelligent device 2), a relative location map among the routing device, the mobile terminal and the two intelligent devices can be obtained according to the step 301 to step 304.

Figure 4:
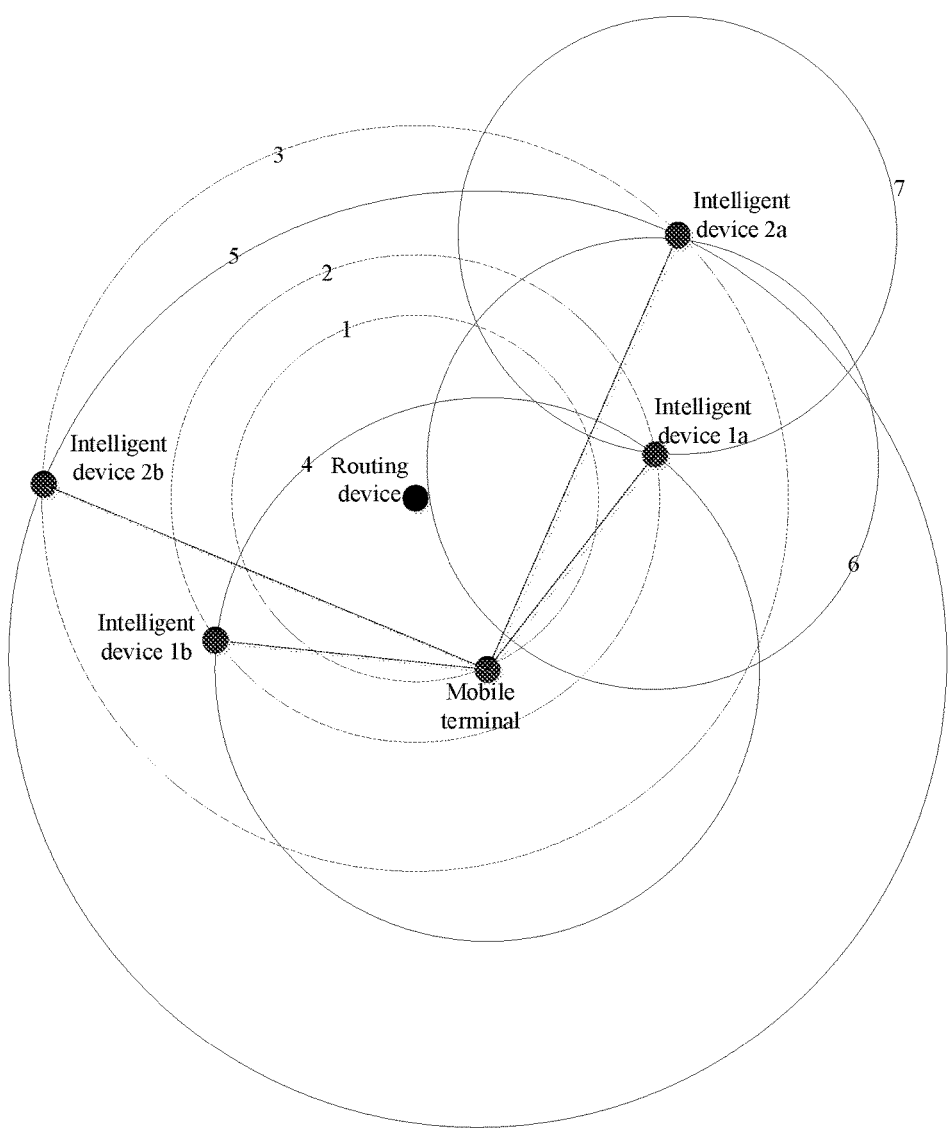
FIG. 4 is a schematic diagram illustrating a relative location map in accordance with an aspect of the present disclosure.

FIG. 4 is a schematic diagram of a relative location map according to an aspect of the present disclosure. In FIG. 4, the circle 1 to circle 3 are circles plotted based on distances between the routing device and the mobile terminal, the intelligent device 1 and the intelligent device 2. The circles are determined by using a formula according to RSSI information of point-to-point messages received by the routing device from the mobile terminal, the intelligent device 1 and the intelligent device 2. The distances may be the radius of respective circles, and the location of the routing device may be the center of respective circles.

The circle 4 and circle 5 are circles plotted based on distances between the mobile terminal and the intelligent device 1 and the intelligent device 2. The circles are determined by using a formula according to RSSI information of point-to-point messages received by the mobile terminal from the intelligent device 1 and the intelligent device 2. The distances may be the radius of respective circles, and the location of the mobile terminal may be the center of respective circles.

The intersections of the circle 2 and the circle 4 can be used to determine the possible position of the intelligent device 1, i.e., the intelligent device 1a and the intelligent device 1b. The intersections of the circle 3 and the circle 5 can be used to determine the possible position of the intelligent device 2, i.e., the intelligent device 2a and the intelligent device 2b.

The circle 6 and the circle 7 are circles plotted based on distance 1 between the intelligent device 1 and the intelligent device 2 and the distance 2 between the intelligent device 2 and the intelligent device 1. The circles are determined by using a formula according to RSSI information of a point-to-point message received by the intelligent device 1 from the intelligent device 2, and RSSI information of a point-to-point message received by the intelligent device 2 from the intelligent device 1. The distance 1 and distance 2 may be the radius of respective circles, and location of the intelligent device 1 and location of the intelligent device 2 may be the center of respective circles.

In this way, it is possible to determine relative position of the routing device, the mobile terminal, the intelligent device 1 and the intelligent device 2. Specifically, the relative positions can be determined for a combination of the routing device, the mobile terminal, the intelligent device 1a and the intelligent device 2a, or a combination of the routing device, the mobile terminal, the intelligent device 1b, and the intelligent device 2b.

In implementations, the number of intelligent devices may not be fixed. When a new intelligent device is added to the local area network and the new intelligent device accesses to the routing device, it is able to determine or report positioning to control and manage the new intelligent device. In another aspect of the present disclosure, when positioning of a new intelligent device is required, the specific process may include the following steps C to E:

In step C, fifth RSSI information is acquired when a new intelligent device appears, where the fifth RSSI information is measured based on a point-to-point message sent by the new intelligent device;

In step D, sixth RSSI information reported by the mobile terminal is received, where the sixth RSSI information is measured based on a point-to-point message sent by the new intelligent device to the mobile terminal.

In step E, at least one seventh RSSI information reported by the new intelligent device is received. At least one seventh RSSI information is measured based on a point-to-point message sent by any one of the at least one intelligent device to the new intelligent device. Determining or reporting of positioning is performed based on the fifth RSSI information, the sixth RSSI information, at least one seventh RSSI information, and a last positioning process.

The steps C to E are similar as those steps 301 to 304. Thus, reporting of positioning of a new intelligent device is performed based on RSSI information of point-to-point messages sent from the new intelligent device to respective positioned devices and in connection with a last positioning process.

The positioning can be achieved in a few different ways.

In a first way, reporting of positioning of the new intelligent device is performed based on the fifth RSSI information, the sixth RSSI information, at least one seventh RSSI information, and positioning result of the last positioning process.

The positioning result refers to a relative location map among the routing device, the mobile terminal and at least one intelligent device obtained by the last positioning. This way, reporting of the positioning of the new intelligent device uses the same method as that in the last positioning process with relative locations of the positioned devices being kept unchanged.

In a second way, positioning of the mobile terminal, the routing device, at least one intelligent device and the new intelligent device are determined based on the fifth RSSI information, the sixth RSSI information, at least one seventh RSSI information, and positioning data acquired in the last positioning process.

The positioning data refer to the distance between the routing device and the mobile terminal, at least one distance between the routing device and at least one intelligent device, at least one distance between the mobile terminal and at least one intelligent device, at least one distance between any one of the at least one intelligent device and other intelligent devices acquired during the last positioning process.

By doing this, in addition to positioning of the new intelligent device by using the same method as that in the last positioning process, adjustment of relative locations of the positioned devices can be performed. The specific positioning process is the same as the above steps 301 to 304, and is described again.

In the present aspect, accurately reporting position is performed by collecting RSSI information of a point-to-point message between every two devices to be positioned, determining the distance between every two devices to be positioned using the RSSI information, deriving a plurality of circles according to the distances, and determining relative location among the devices based on intersections between the circles to obtain and communicate a relative location map.

In addition, when a new intelligent device appears, it is able to implement positioning of the new intelligent devices by collecting RSSI information of a point-to-point message between the new intelligent device and respective positioned devices and determining the distance between the new intelligent device and respective positioned devices. The positioning may be implemented with any one of the two discussed ways and is thus flexible.

Sometimes, an existing intelligent device may be removed. When this happens, the relative location map may be regenerated based on the collected RSSI information for devices left.

Sometimes, an existing intelligent device may be replaced by another intelligent device. If the to be replaced intelligent device and the replaced device have the identical location, the relative location map may not need to be changed. However, in order to make sure the replaced intelligent device is placed at the same location of the to-be replaced intelligent device, the relative location map may be regenerated by re-collecting RSSI information and re-determining the distances between the replaced intelligent device and each of respective positioned devices. In this case, the location map may prompt placement of the replacement device.

At step 305, the relative location map is transmitted to the mobile terminal.

The routing device management APP installed on the mobile terminal can display the relative location map among the devices to be positioned. When the relative location map is displayed, identifier or device name and other information of each device may also be displayed on the relative location map.

In the present aspect, it is the routing device that plots the relative position map and transmits it to the mobile device. In another aspect of the present disclosure, the routing device may transmit the RSSI information of a point-to-point message between every two devices to be positioned to a designated server such that the designated server plots the relative location map and then transmits the relative location map to the mobile device.

When the relative location map is plotted by a designated server, the routing device may send update RSSI information to the server when there are changes discovered between devices. For example, one intelligent device may be moved to a different location or a new intelligent device may be added. When the routing device discovers a change of location information for any devices, the routing device may send a complete new RSSI information to the server or only send the changed RSSI information to the server. The server may plot the relative location map again by using the updated RSSI information.

Figure 5:
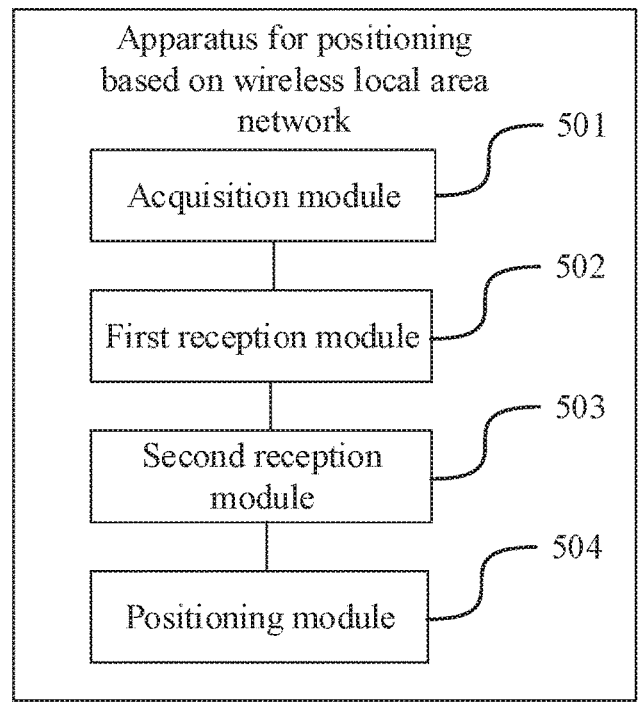
FIG. 5 shows a block diagram of a WLAN based positioning device in accordance with an aspect of the present disclosure.

FIG. 5 shows a block diagram of a WLAN based positioning device according to an aspect of the present disclosure. As shown in FIG. 5, the device includes an acquisition module 501, a first reception module 502, a second reception module 503, and a positioning module 504.

The acquisition module 501 may be configured to acquire first RSSI information and at least one second RSSI information. The first RSSI information is measured based on a point-to-point message sent by a mobile terminal, and the at least one second RSSI information is measured based on a point-to-point message sent by at least one intelligent device.

The first reception module 502 may be configured to receive at least one third RSSI information reported by the mobile terminal. The at least one third RSSI information is measured based on a point-to-point message sent by the at least one intelligent device to the mobile terminal.

The second reception module 503 may be configured to receive at least one fourth RSSI information reported by the at least one intelligent device. The at least one fourth RSSI information may be measured based on a point-to-point message sent by any one of at least one intelligent device to other intelligent devices.

The positioning module 504 may be configured to report positioning of the mobile terminal, the routing device, and at least one intelligent device based on the first RSSI information, at least one second RSSI information, at least one third RSSI information, and at least one fourth RSSI information.

Figure 6:
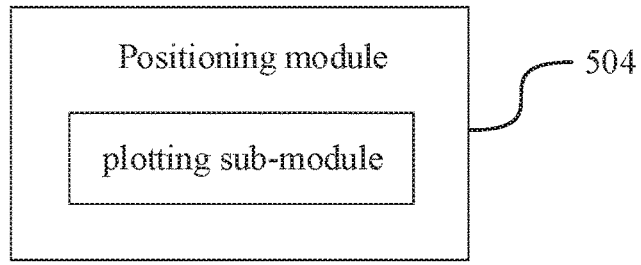
FIG. 6 shows a block diagram of a positioning module with a plotting sub-module in accordance with an aspect of the present disclosure.

In one possible implementation, as shown in FIG. 6, the positioning module 504 may include a plotting sub-module configured to plot a relative location map based on the first RSSI information, at least one second RSSI information, at least one third RSSI information, and at least one fourth RSSI information, and transmit the relative location map to the mobile terminal, where the relative location map indicates relative position between the mobile terminal, the routing device, and the at least one intelligent device.

Figure 7:
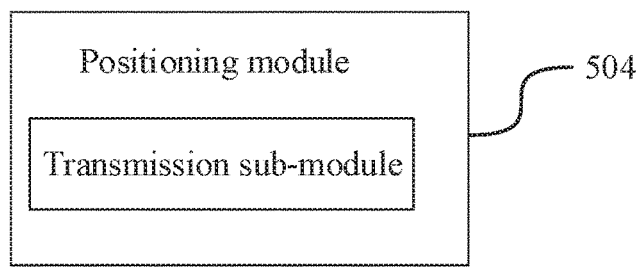
FIG. 7 shows a block diagram of a positioning module with a transmission sub-module in accordance with an aspect of the present disclosure.

Alternatively, as shown in FIG. 7, the positioning module 504 may include a transmission sub-module configured to transmit the first RSSI information, at least one second RSSI information, at least one third RSSI information, and at least one fourth RSSI information to a designated server such that the designated server plots the relative location map and then transmits the relative location map to the mobile terminal.

In one possible implementation, the plotting sub-module may be configured to determine a first distance between the routing device and the mobile terminal based on the first RSSI information, where any point on a first circle is the location of the mobile terminal, the center of first circle is the location of the routing device, and the radius of the first circle is the first distance.

The plotting sub-module may be configured to determine at least one second distance between the routing device and the at least one intelligent device based on at least one second RSSI information and determine at least one third distance between the mobile terminal and the at least one intelligent device based on the at least one third RSSI information, where at least two intersections of at least one second circle and at least one third circle are possible locations of the at least one intelligent device, the center of each second circle is the location of the routing device, the radius of each second circle is the second distance, the center of each third circle is the location of the mobile terminal and the radius of the third circle is the third distance.

In one possible implementation, the acquisition module 501 may be further configured to acquire fifth RSSI information when a new intelligent device appears, where the fifth RSSI information is measured based on a point-to-point message sent by the new intelligent device.

The acquisition module 502 may be further configured to acquire fifth RSSI information when a new intelligent device appears, where the fifth RSSI information is measured based on a point-to-point message sent by the new intelligent device.

The second reception module 503 may be further configured to receive at least one seventh RSSI information reported by the new intelligent device, where the at least one seventh RSSI information is measured based on a point-to-point message sent by any one of the at least one intelligent device to the new intelligent device.

The positioning module 504 may be further configured to determine positioning based on the fifth RSSI information, the sixth RSSI information, the at least one seventh RSSI information, and a last positioning process.

In one possible implementation, the positioning module 504 may be further configured to determine positioning of the new intelligent device based on the fifth RSSI information, the sixth RSSI information, the at least one seventh RSSI information, and positioning result of the last positioning process.

Alternatively, the positioning module 504 may be further configured to determine positioning of the mobile terminal, the routing device, the at least one intelligent device and the new intelligent device based on the fifth RSSI information, the sixth RSSI information, the at least one seventh RSSI information, and positioning data acquired in the last positioning process.

With respect to the device in the above aspect, the specific mode in which each module performs the operation has been described in detail in the aspect relating to the method, and the description thereof may not be described in detail.

Figure 8:
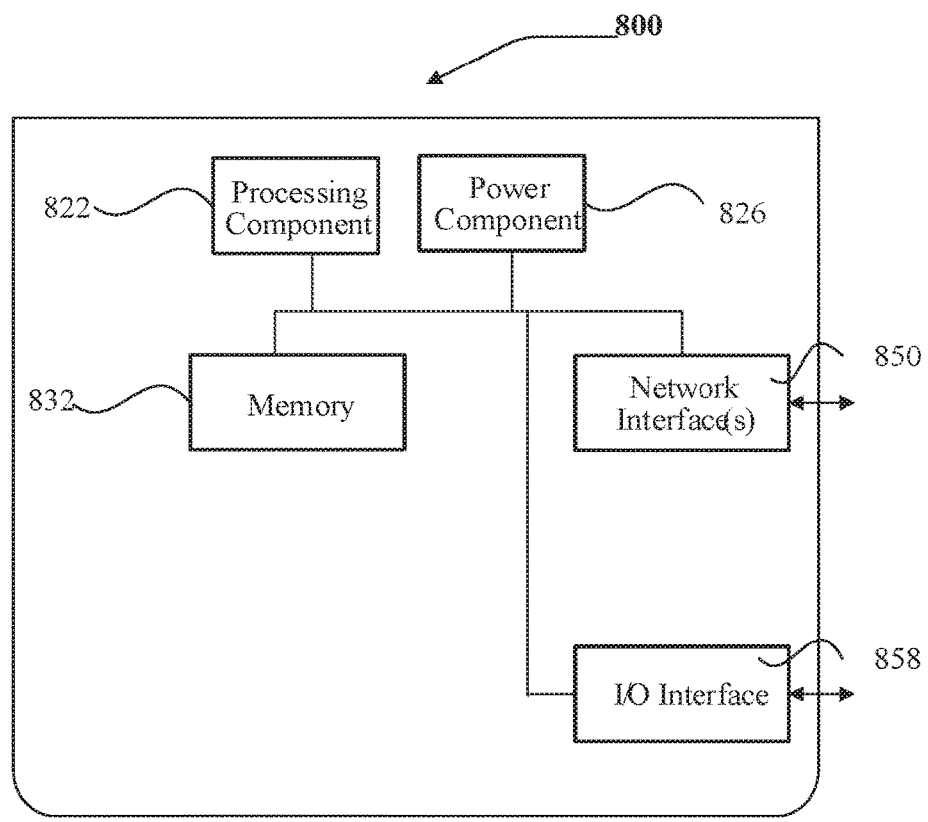
FIG. 8 shows a block diagram of a routing device in accordance with an aspect of the present disclosure.

FIG. 8 shows a block diagram of a routing device 800 according to an aspect of the present disclosure. For example, the routing device 800 may be a wireless router. A shown in FIG. 8, the routing device 800 includes a processing component 822 (which includes one or more processors); a memory 832 representing memory resources, which is used for storing instructions, such as application programs, executable by the processing component 822. The application programs stored in the memory 832 may include one or more modules, each module corresponds to a set of instructions. Further, the processing component 822 may be configured to execute the instructions to perform the WLAN based positioning method.

The routing device 800 may also include: a power supply 826 configured to perform power management of the routing device 800; a wired or wireless network interface 850 configured to connect the routing device 800 to a network; an input/output (I/O) interfaces 858. The routing device 80 is optional based on an operating system stored in the memory 832, such as Windows Server™, Mac OS X™, Unix™, Linux™, FreeBSD™, or the like.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other examples of the present disclosure are readily apparent to those skilled in the art upon consideration of the specification and practice of the disclosure disclosed herein. The present application is intended to cover any variations, uses, or adaptations of the present disclosure that follow the general principles of the present disclosure and include the common general knowledge or conventional technical means in the art without departing from the present disclosure. The specification and examples are to be regarded as illustrative only, and the true scope and spirit of the disclosure is indicated by the following claims.

It is to be understood that this disclosure is not limited to the precise constructions described above and shown in the accompanying drawings, and that various modifications and changes may be made without departing from the scope thereof. The scope of the present disclosure is limited only by the appended claims.

What is claimed is:

1. A wireless local area network based positioning method, comprising:

Acquiring, by first Received Signal Strength Indicator (RSSI) information and at least one second RSSI information, wherein the first RSSI information is measured based on a first point-to-point message sent by a mobile terminal to a routing device, and the at least one second RSSI information is measured based on a second point-to-point message sent by at least one intelligent device to the routing device;

receiving at least one third RSSI information reported by the mobile terminal, wherein the at least one third RSSI information is measured based on a third point-to-point message sent by the at least one intelligent device to the mobile terminal;

receiving at least one fourth RSSI information reported by the at least one intelligent device, wherein the at least one fourth RSSI information is measured based on a fourth point-to-point message sent by any one of the at least one intelligent device to other intelligent devices;

reporting positioning of the mobile terminal, the routing device, and the at least one intelligent device based on the first RSSI information, the at least one second RSSI information, the at least one third RSSI information, and the at least one fourth RSSI information; and re-collecting RSSI information and re-determining positioning of the mobile terminal, the routing device, and the at least one intelligent device when any one of the at least one intelligent device is replaced wherein the replaced intelligent device is placed according to the re-collected RSSI information and the re-determined positioning of the mobile terminal, the routing device, and the at least one intelligent device; and wherein reporting positioning of the mobile terminal, the routing device, and the at least one intelligent device based on the first RSSI information, the at least one second RSSI information, the at least one third RSSI information, and the at least one fourth RSSI information comprises one of:

deriving a relative location map based on the first RSSI information, the at least one second RSSI information, the at least one third RSSI information, and the at least one fourth RSSI information, and transmitting the relative location map to the mobile terminal, wherein the relative location map indicates relative positions of the mobile terminal, the routing device, and the at least one intelligent device, and transmitting the first RSSI information, the at least one second RSSI information, the at least one third RSSI information, and the at least one fourth RSSI information to a designated server such that the designated server plots the relative location map and then transmits the relative location map to the mobile terminal;

wherein deriving the relative location map based on the first RSSI information, the at least one second RSSI information, the at least one third RSSI information, and the at least one fourth RSSI information comprises:

determining a first distance between the routing device and the mobile terminal based on the first RSSI information, wherein any point on a first circle is a location of the mobile terminal, a center of first circle is a location of the routing device, and a radius of the first circle is the first distance; and determining at least one second distance between the routing device and the at least one intelligent device based on the at least one second RSSI information and determining at least one third distance between the mobile terminal and the at least one intelligent device based on the at least one third RSSI information;

wherein at least two intersections of at least one second circle and at least one third circle are possible locations of the at least one intelligent device, a center of each second circle is a location of the routing device, a radius of each second circle is the second distance, a center of each third circle is a location of the mobile terminal and a radius of the third circle is the third distance.

2. The method according to claim 1, further comprising:

acquiring fifth RSSI information when a new intelligent device appears, wherein the fifth RSSI information is measured based on a fifth point-to-point message sent by the new intelligent device;

receiving sixth RSSI information reported by the mobile terminal, wherein the sixth RSSI information is measured based on a sixth point-to-point message sent by the new intelligent device to the mobile terminal;

receiving at least one seventh RSSI information reported by the new intelligent device, wherein the at least one seventh RSSI information is measured based a seventh point-to-point message sent by any one of the at least one intelligent device to the new intelligent device; and reporting positioning based on the fifth RSSI information, the sixth RSSI information, the at least one seventh RSSI information, and a last positioning process.

3. The method according to claim 2, wherein reporting positioning based on the fifth RSSI information, the sixth RSSI information, the at least one seventh RSSI information, and the last positioning process comprises:

reporting positioning of the new intelligent device based on the fifth RSSI information, the sixth RSSI information, the at least one seventh RSSI information, and positioning result of the last positioning process; or reporting positioning of the mobile terminal, the routing device, the at least one intelligent device and the new intelligent device based on the fifth RSSI information, the sixth RSSI information, the at least one seventh RSSI information, and positioning data acquired in the last positioning process.

4. A wireless local area network based positioning device, comprising:

a processor, a memory for storing instructions executable by the processor, wherein the processor is configured to:

acquire first Received Signal Strength Indicator (RSSI) information and at least one second RSSI information, wherein the first RSSI information is measured based on a first point-to-point message sent by a mobile terminal to the positioning device, and the at least one second RSSI information is measured based on a second point-to-point message sent by at least one intelligent device to the positioning device, wherein the at least one intelligent device is at least one smart home device;

receive at least one third RSSI information reported by the mobile terminal, wherein the at least one third RSSI information is measured based on a third point-to-point message sent by the at least one intelligent device to the mobile terminal;

receive at least one fourth RSSI information reported by the at least one intelligent device, wherein the at least one fourth RSSI information is measured based on a fourth point-to-point message sent by any one of the at least one intelligent device to other intelligent devices;

generate a report indicating positioning of the mobile terminal, the positioning device, and the at least one intelligent device based on the first RSSI information, the at least one second RSSI information, the at least one third RSSI information, and the at least one fourth RSSI information; and re-collect RSSI information and re-determine positioning of the mobile terminal, the positioning device, and the at least one intelligent device when any one of the at least one intelligent device is replaced wherein the replaced intelligent device is placed according to the re-collected RSSI information and the re-determined positioning of the mobile terminal, the routing device, and the at least one intelligent device; and wherein the processor is configured to:

derive a relative location map based on the first RSSI information, the at least one second RSSI information, the at least one third RSSI information, and the at least one fourth RSSI information, wherein the relative location map indicates relative positions of the mobile terminal, the positioning device, and the at least one intelligent device, wherein the processor configured to derive the relative location map based on the first RSSI information, the at least one second RSSI information, the at least one third RSSI information, and the at least one fourth RSSI information is further configured to:

determine a first distance between the positioning device and the mobile terminal based on the first RSSI information, wherein any point on a first circle is a location of the mobile terminal, a center of first circle is a location of the positioning device, and a radius of the first circle is the first distance; and determine at least one second distance between the positioning device and the at least one intelligent device based on the at least one second RSSI information and determine at least one third distance between the mobile terminal and the at least one intelligent device based on the at least one third RSSI information;

wherein at least two intersections of at least one second circle and at least one third circle are possible locations of the at least one intelligent device, a center of each second circle is a location of the positioning device, a radius of each second circle is the second distance, a center of each third circle is a location of the mobile terminal and a radius of the third circle is the third distance.

5. The device according to claim 4, wherein the processor is configured to:

plot a relative location map based on the first RSSI information, the at least one second RSSI information, the at least one third RSSI information, and the at least one fourth RSSI information, and transmit the relative location map to the mobile terminal, wherein the relative location map indicates relative positions of the mobile terminal, the positioning device, and the at least one intelligent device; or transmit the first RSSI information, the at least one second RSSI information, the at least one third RSSI information, and the at least one fourth RSSI information to a designated server such that the designated server plots the relative location map and then transmits the relative location map to the mobile terminal.

6. The device according to claim 5, wherein the processor is configured to:

determine a first distance between the positioning device and the mobile terminal based on the first RSSI information, wherein any point on a first circle is a location of the mobile terminal, a center of the first circle is a location of the positioning device, and a radius of the first circle is the first distance; and determine at least one second distance between the positioning device and the at least one intelligent device based on the at least one second RSSI information and determine at least one third distance between the mobile terminal and the at least one intelligent device based on the at least one third RSSI information;

wherein at least two intersections of at least one second circle and at least one third circle are possible locations of the at least one intelligent device, a center of each second circle is a location of the positioning device, a radius of each second circle is the second distance, a center of each third circle is a location of the mobile terminal and a radius of the third circle is the third distance.

7. The device according to claim 4, wherein the processor is configured to:

acquire fifth RSSI information when a new intelligent device appears, wherein the fifth RSSI information is measured based on a fifth point-to-point message sent by the new intelligent device;

receive sixth RSSI information reported by the mobile terminal, wherein the sixth RSSI information is measured based on a sixth point-to-point message sent by the new intelligent device to the mobile terminal;

receive at least one seventh RSSI information reported by the new intelligent device, wherein the at least one seventh RSSI information is measured based a seventh point-to-point message sent by any one of the at least one intelligent device to the new intelligent device; and generate a report indicating positioning based on the fifth RSSI information, the sixth RSSI information, the at least one seventh RSSI information, and a last positioning process.

8. The device according to claim 7, wherein the processor is further configured to:

determine positioning of the new intelligent device based on the fifth RSSI information, the sixth RSSI information, the at least one seventh RSSI information, and positioning result of the last positioning process; or determine positioning of the mobile terminal, the positioning device, the at least one intelligent device and the new intelligent device based on the fifth RSSI information, the sixth RSSI information, the at least one seventh RSSI information, and positioning data acquired in the last positioning process.

9. A non-transitory computer readable storage medium including instructions thereon, which, when executed by a processor of a mobile terminal, cause the mobile terminal to:

acquire first Received Signal Strength Indicator (RSSI) information and at least one second RSSI information, wherein the first RSSI information is measured based on a first point-to-point message sent by a mobile terminal to a routing device, and the at least one second RSSI information is measured based on a second point-to-point message sent by at least one intelligent device to the routing device;

receive at least one third RSSI information reported by the mobile terminal, wherein the at least one third RSSI information is measured based on a third point-to-point message sent by the at least one intelligent device to the mobile terminal;

receive at least one fourth RSSI information reported by the at least one intelligent device, wherein the at least one fourth RSSI information is measured based on a fourth point-to-point message sent by any one of the at least one intelligent device to other intelligent devices;

determine positioning of the mobile terminal, the routing device, and the at least one intelligent device based on the first RSSI information, the at least one second RSSI information, the at least one third RSSI information, and the at least one fourth RSSI information; and re-collect RSSI information and re-determine positioning of the mobile terminal, the routing device, and the at least one intelligent device when any one of the at least one intelligent device is replaced wherein the replaced intelligent device is placed according to the re-collected RSSI information and the re-determined positioning of the mobile terminal, the routing device, and the at least one intelligent device; and wherein the instructions further cause the mobile terminal to:

derive a relative location map based on the first RSSI information, the at least one second RSSI information, the at least one third RSSI information, and the at least one fourth RSSI information, wherein the relative location map indicates relative positions of the mobile terminal, the positioning device, and the at least one intelligent device, wherein the instructions caused the mobile terminal to derive the relative location map based on the first RSSI information, the at least one second RSSI information, the at least one third RSSI information, and the at least one fourth RSSI information further cause the mobile terminal to:

determine a first distance between the positioning device and the mobile terminal based on the first RSSI information, wherein any point on a first circle is a location of the mobile terminal, a center of first circle is a location of the positioning device, and a radius of the first circle is the first distance; and determine at least one second distance between the positioning device and the at least one intelligent device based on the at least one second RSSI information and determine at least one third distance between the mobile terminal and the at least one intelligent device based on the at least one third RSSI information;

wherein at least two intersections of at least one second circle and at least one third circle are possible locations of the at least one intelligent device, a center of each second circle is a location of the positioning device, a radius of each second circle is the second distance, a center of each third circle is a location of the mobile terminal and a radius of the third circle is the third distance.

* * * * *